United States Patent [19]

Oosaka et al.

[11] 4,425,171

[45] Jan. 10, 1984

[54] PRECISION POSITIONING METHOD

[75] Inventors: Shigenori Oosaka; Tsuneo Komura, both of Asaka, Japan

[73] Assignee: Fuji Photo Film Co., Ltd., Asaka, Japan

[21] Appl. No.: 312,083

[22] Filed: Oct. 16, 1981

[30] Foreign Application Priority Data

Oct. 31, 1980 [JP] Japan ............................... 55-153432

[51] Int. Cl.³ .................................... B32B 31/12
[52] U.S. Cl. ...................... 156/64; 156/276; 156/306.6; 156/306.9; 428/220; 428/323; 428/454
[58] Field of Search ............... 156/64, 306.9, 276, 156/306.6; 428/206, 220, 323, 454

[56] References Cited

U.S. PATENT DOCUMENTS 3,406,053 10/1968 Jaenicke ........................... 156/306.9
4,362,771 12/1982 Umeda et al. ................. 156/306.6 X Primary Examiner—Robert A. Dawson
Attorney, Agent, or Firm—Gerald J. Ferguson, Jr.; Joseph J. Baker

[57] ABSTRACT

A precision positioning system wherein a curable, non-fluid, plastic bonding agent is applied between the object to be positioned and the object on which it is to be positioned and the object is positioned before the bonding agent hardens, whereafter it is fixed in position by the hardening of the bonding agent.

9 Claims, 1 Drawing Figure

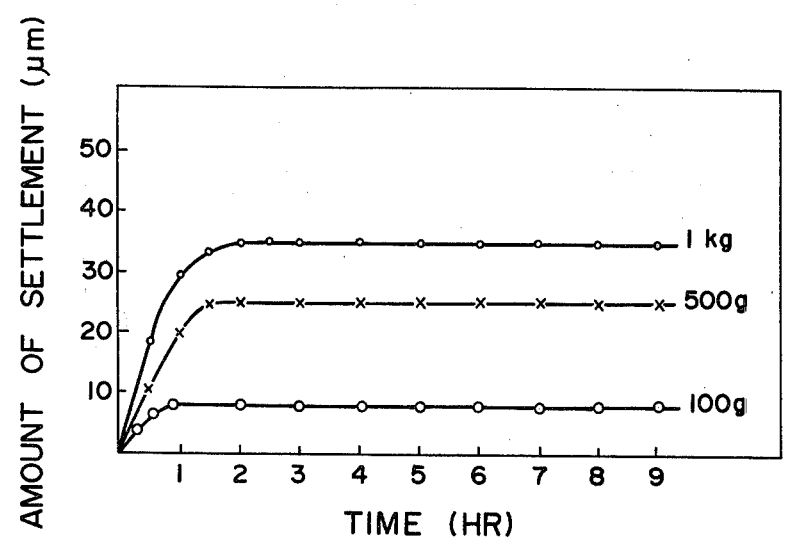

PRECISION POSITIONING METHOD

BACKGROUND OF THE INVENTION

1. Field of the Invention

This invention relates to a method for precisely positioning optical components and the components of other precision instruments.

2. Description of the Prior Art

The components of optical apparatuses and various other precision instruments must be positioned with a high degree of precision. Precision positioning is thus carried out by a number of methods including some involving fine adjustment using a fine adjustment mechanism or thin foils. In another method, the required positional accuracy is accomplished by high-precision machining of the contact surfaces or points between adjacent components. In still another, the component to be positioned is positionally adjusted by hand finishing of its contact points and surfaces after being actually assembled into the device concerned. All of these conventional methods are, however, defective either in terms of cost or of the effect produced. Consequently, there is a need for a precision positioning method that is both cheap and reliable.

Positioning using a fine adjustment mechanism is disadvantageous first in that the fine adjustment mechanism is itself an expensive piece of equipment and further in that the mechanism not only is large but is impossible to make more compact because of the necessity of inserting the hand during the fine adjustment operation. There are also problems in the practical application of the mechanism. For one thing, in carrying out three-dimensional adjustment a great deal of time is required by anyone but a most highly experienced operator. For another, positioning with a fine adjustment mechanism always entails the danger of a positional shift due to vibration or impact after the adjustment has been completed.

The foil adjustment method does not require much space but is nevertheless disadvantageous in that three-dimensional adjustment is time consuming and requires considerable experience. Another drawback of this method is that when the component is screwed down to immobilize it following positional adjustment, there is a danger that the foil may be deformed by the tightening force of the screws thus causing a shift in position of the component. Also, as in the method using a fine adjustment mechanism, there is the possibility of the once-positioned component being jarred out of place by vibration or impact.

The method of positioning by increasing the mechanical precision of the component through high-precision machining is exceedingly costly. Also, as the presence of foreign particles or scratches will cause positioning error, this method requires great care to be given to the conditions surrounding the assembly operation. Another shortcoming of the method is that the high-precision machining work becomes exceedingly difficult when the shape of the component is complex. In some cases, it may become impossible to carry out satisfactorily.

The method of positioning by hand finishing at the time of assembly not only requires a highly skilled workman but is time consuming.

SUMMARY OF THE INVENTION

The object of the present invention is to provide a cheap and easily carried out precision positioning and fixing method which overcomes the disadvantages mentioned above in connection with conventional precision positioning methods.

The precision positioning method according to the present invention is characterized in that a special bonding agent is used to fix the optical component or the like in position. The positioning is carried out before the bonding agent hardens and then the component is left as it is to be fixed in position by the hardening of the bonding agent. More specifically, the bonding agent is such that it does not harden before the end of a prescribed period during which the positioning is carried out and then following this period hardens to provide a strong bonding force. Prior to hardening, the bonding agent is a non-fluid, plastically deformable substance and is applied between the component and the object to which the component is to be fixed (e.g. the bottom of the device being assembled). After the positioning operation has been completed, the bonding agent hardens to fix the component in position.

BRIEF DESCRIPTION OF THE DRAWING

The single FIGURE is a graph showing the relationship between the weight of a component and the amount of settlement at the time the bonding agent in accordance with the present invention has hardened.

DESCRIPTION OF THE PREFERRED EMBODIMENT

Now the present invention will be described in detail with reference to the drawing.

As the bonding agent for this invention there is used a non-fluid, plastically deformable substance with hardening capability consisting of a fine powder filler and a curable, non-solvent type bonding component.

The fine powder filler may be either an organic or an inorganic material. Some examples of each type are listed below.

Among the usable inorganic fillers there can be mentioned clays (e.g. kaoline, bentonite, bauxitic clay, porcelain clay etc.), asbestos powder, borax, titanium oxide, zinc oxide, iron oxide, magnesium oxide, aluminum oxide, aluminum carbonate, potassium carbonate, magnesium carbonate, calcium carbonate, gypsum (barium sulfate), glass beads, glass microballoons (minute hollow glass spheres), anhydrous potassium silicate, calcium silicate, quartz powder, talc (hydrous silicate of magnesium), iron powder, nickel powder, aluminum powder, brass powder etc.

Among the usable organic fillers are starch powder, phenol resin powder, polyethylene terephthalate powder, polymethyl methacrylate powder, polystyrene powder, phenol resin microballoons etc.

As the curable, non-solvent type bonding component there can be used an epoxy type bonding material, an unsaturated polyester type bonding material, a polyester acrylate type bonding material, a furan type bonding material etc. Although all of these bonding agents are curable in the normal temperature range (10°–40° C.), the epoxy type bonding material undergoes the least cubical contraction during hardening. Also, these bonding agents all provide strong bonding force in the hardened state so that they can be used to fix optical components with a fastness equal to that provided by screws or the like.

By an epoxy type bonding material is meant one consisting of epoxy resin, a curing agent (amine) and an accelerator (acid, alcohol, phenol etc.). Epoxy type bonding materials can be either of the single fluid or the two fluid type.

By an unsaturated polyester type bonding material is meant one consisting of unsaturated polyester, a crosslinking agent (vinyl monomer) a catalyst and an accelerator. As the unsaturated polyester there is used the dehydrate condensation polyester of a polyhydric alcohol such as ethylene glycol, diethylene glycol or the like, and an unsaturated dibasic acid such as maleic acid, fumaric acid or the like.

By a polyester acrylate type bonding material is meant one consisting of the condensation product of anhydrous phthalic acid, ethylene glycol and metaacrylic acid, and a radical polymerization catalyst (a peroxide compound).

By a furan type bonding material is meant one consisting of the precondensate of furfural or furfuryl alcohol, and a catalyst (an acid).

The curable, non-fluid, plastically deformable bonding agents of the aforesaid compositions can be used as the bonding agent for this invention insofar as they have a yield strength of between about 70 g/cm$^2$ and about 20 kg/cm$^2$, preferably between about 100 g/cm$^2$ and about 10 kg/cm$^2$, and a viscosity of between about 10$^6$ and about 10$^{11}$ poise, preferably between about 10$^7$ and about 10$^{10}$ poise. The amount of filler is selected to achieve this viscosity.

In the present invention, the curable bonding agent having the aforesaid composition and physical properties is applied in its uncured state between the optical component and the apparatus into which it is to be assembled, for example, between the bottom of the component and the floor of the apparatus housing. The component is then position, by hand for example, before the bonding agent sets. After the component has been positioned, it is left "as is" until the bonding agent hardens to fix it permanently in place.

In this process, the plastic bonding agent deforms in response to the movement of the component during positioning and then maintains the component in its adjusted position after it is released. This makes the positioning work extremely easy to carry out. Moreover, since the bonding agent is substantially non-fluid in nature, it is capable of temporarily immobilizing the component after positioning, thus making it possible to position and fix the component in any desired orientation.

Although it is possible that the weight of the component may cause slight plastic deformation of the bonding agent after it is released, the amount of this deformation is so small (about 1/100 mm for a 100 g component) as to be negligible. This deformation therefore almost never causes any inconvenience in practical positioning work. What is more, the amount of plastic deformation is proportional to the weight of the component and can be predicted in advance so that in cases where particularly precise positioning is required, the amount of deformation can be calculated in advance and the position of the component can be offset accordingly to obtain very high positioning accuracy.

One example of the invention will now be described.

An epoxy/polyamide resin type bonding material obtained by mixing a first fluid consisting of 50% (percent by volume; hereinafter the same) calcium carbonate and 25% kaoline as filler and 25% epoxy resin as bonding component and a second fluid consisting of 55% calcium carbonate and 25% kaoline as filler and 18% polyamide, 1% bisphenol A and 1% anhydrous phthalic acid as bonding component was used to position the lenses, mirrors and other components of a laser recording apparatus.

The curing (setting) time of the bonding agent was two hours so that the agent remained plastically deformable for a period of time adequate to permit completion of the positioning work. After the bonding agent had hardened, its bonding strength was found to be high enough to permit machining of the attached components.

The amount of plastic deformation due to the weight of the components between the completion of positioning and the time the agent had fully set (i.e. the amount of settlement) was measured and found to be less than 10 $\mu$m for a 100 g component and about 35 $\mu$m for a 1 kg component. Settlement of this small magnitude was found to be negligible in terms of its effect on the performance of the laser recording apparatus. Moreover, the lateral shift in position during settlement was found to be less than 1 $\mu$m, an exceedingly small value that can be considered negligible in the positioning operation.

The results obtained by measuring the amount of settlement are shown in the Figure. As will be noted, the position of a 100 g component stabilized in 50 min. and the amount of settlement over this period was 8 $\mu$m; the position of 500 g component stabilized in 90 min. and the amount of settlement over this period was 25 $\mu$m; and the position of a 1 kg component stabilized in 120 min. and the amount of settlement over this period was 35 $\mu$m.

In the case of an apparatus where very high precision position is important, it is sufficient to calculate the amount of settlement in advance and shift the initial position of the component upward by the calculated amount. The effectiveness of this technique was also ascertained by experiment.

As is clear from the description set forth above, the only material required for carrying out the positioning method according to this invention is a curable, non-fluid, plastic bonding agent and the only work required for accomplishing the precise positioning of a component is to adjust it to the desired position by hand and then to leave it as is to be bonded firmly in place. As a consequence, this method permits the positioning work to be carried out very cheaply by a very simple operation. Moreover, as the positional shift of the component after it is positioned and released is a few tens of microns at most, the method provides high positioning accuracy which makes it highly advantageous in practical application.

It should be noted that although in the example set forth above the positioning was carried out by hand, the method can also provide simple and inexpensive precision positioning when used in conjunction with automatic assembly equipment wherein the fixing of components is carried out using jigs. For example, the method can be used in conjunction with automatic assembly equipment for cameras and other optical apparatuses wherein lenses and mirrors are precision positioned by the use of jigs.

We claim:

1. A precision positioning method comprising applying a curable, non-fluid, plastically deformable bonding agent in the form of a non-film adhesive between the mutually contacting portions of a component and the object on which the component is to be positioned, said bonding agent having a viscosity between $10^6$ and $10^{11}$ poise and having as its main components a fine powder filler and a curable bonding component, positioning the component to deform the bonding agent before the bonding agent hardens, and releasing the positioned component to be fixed in the positioned orientation by the hardening of the bonding agent.

2. A precision positioning method as defined in claim 1 wherein the bonding agent has a yield strength of between 70 g/cm$^2$ and 20 kg/cm$^2$.

3. A precision positioning method as defined in claim 1 or 2 wherein the curable bonding component is a non-solvent type bonding component.

4. A precision positioning method as defined in claim 1 wherein the bonding agent undergoes substantially no change in volume during hardening.

5. A precision positioning method as defined in claim 1 wherein the fine powder filler is a clay.

6. A precision positioning method as in claim 1 where said viscosity is between $10^7$ and $10^{10}$ poise.

7. A precision positioning method as in claim 1 carried out at a temperature of 10°–40° C.

8. A precision positioning method as defined in claim 1 wherein the bonding agent includes $CaCO_3$ and kaoline as the fine powder filler.

9. A precision positioning method as in claim 1 including the step of determining the amount of settlement in using the bonding agent for the component to be positioned and where said positioning step is such that the component is positioned so as to compensate for the determined amount of settlement.

* * * * *